US008838700B2

(12) United States Patent
Jang

(10) Patent No.: US 8,838,700 B2
(45) Date of Patent: Sep. 16, 2014

(54) METHOD, SYSTEM, AND COMPUTER PROGRAM PRODUCT FOR MESSAGE MAPPING OF COMMUNICATIONS

(75) Inventor: Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 1440 days.

(21) Appl. No.: 12/121,040

(22) Filed: May 15, 2008

(65) Prior Publication Data

US 2008/0215699 A1     Sep. 4, 2008

Related U.S. Application Data

(63) Continuation of application No. 11/465,142, filed on Aug. 17, 2006, now abandoned.

(51) Int. Cl.
G06F 15/16         (2006.01)
H04L 12/58         (2006.01)

(52) U.S. Cl.
CPC ............. *H04L 12/581* (2013.01); *H04L 51/04* (2013.01)
USPC ............ 709/206; 709/204; 709/207; 709/228

(58) Field of Classification Search
CPC ............................... H04L 51/04; H04L 12/581
USPC .................................. 709/204, 206, 207, 228
See application file for complete search history.

(56) References Cited

U.S. PATENT DOCUMENTS

| | | |
|---|---|---|
| 6,278,996 B1 | 8/2001 | Richardson et al. |
| 6,651,218 B1 | 11/2003 | Adler et al. |
| 2003/0023684 A1 * | 1/2003 | Brown et al. ................. 709/204 |
| 2003/0131055 A1 * | 7/2003 | Yashchin et al. ............. 709/204 |
| 2003/0210265 A1 | 11/2003 | Haimberg |
| 2004/0054428 A1 | 3/2004 | Sheha et al. |
| 2004/0133640 A1 | 7/2004 | Yeager et al. |
| 2004/0143632 A1 | 7/2004 | McCarty |
| 2004/0143633 A1 | 7/2004 | McCarty |
| 2004/0152477 A1 | 8/2004 | Wu et al. |
| 2004/0153456 A1 | 8/2004 | Charnock et al. |
| 2004/0264456 A1 | 12/2004 | Beckmann et al. |
| 2005/0055416 A1 | 3/2005 | Heikes et al. |
| 2005/0156873 A1 | 7/2005 | Walter et al. |
| 2005/0281276 A1 | 12/2005 | West et al. |

\* cited by examiner

*Primary Examiner* — David X Yi
(74) *Attorney, Agent, or Firm* — Cantor Colburn LLP

(57) ABSTRACT

A method, system, and computer program product for implementing message mapping of communications is provided. The method includes receiving a communication and a time-stamp of the communication from a messaging system of an originating terminal device and receiving a request to respond to the communication from a messaging system at a recipient terminal device. The request includes a first response and a first selected portion of the communication to which the first response is directed. The method also includes generating an index that defines parameters of the first selected portion in context with the communication and generating a responsive communication that includes the first response and the index. The index is operable for communicating the parameters of the first selected portion to the originating terminal device. The method further includes mapping the responsive communication to the communication via the time-stamp.

18 Claims, 4 Drawing Sheets

User 1: I need to get a status from you to finish up my project plan. Did you finish the requirement for "validation enhancement on all form submissions"?

User 1: And what about "validation enhancement on server side for data accuracy", "changing text on form submissions", and "setting up data backup from database"?

User 2: "validation enhancement on all form submissions" is done, "validation enhancement on server side for data accuracy" is 80% complete, "changing text on form submission" is not started yet, and setting up data backup from database" is still in the design phase.

FIG. 1
(PRIOR ART)

METHOD, SYSTEM, AND COMPUTER PROGRAM PRODUCT FOR MESSAGE MAPPING OF COMMUNICATIONS

CROSS-REFERENCE TO RELATED APPLICATION

This application is a continuation of U.S. patent application Ser. No. 11/465,142, filed Aug. 17, 2006, the disclosure of which is incorporated by reference herein in its entirety.

BACKGROUND OF THE INVENTION

The present disclosure relates generally to messaging applications and, in particular, to a method, system, and computer program product for messaging mapping of communications.

Messaging applications (e.g., instant messaging) have become a popular form of communication. Many Internet service providers, Web portal sites, and various other network enterprises are now offering some form of instant messaging service to their customers. However, one of the challenges faced by users of these services is navigating through a conversational flow. For example, a messaging exchange between two users can result in multiple statements/queries that become difficult to manage when relating backward to particular elements of the conversation. FIG. 1 illustrates a user interface screen 100 with a sample two-way communication between Users 1 and 2. As can be seen from the conversation provided in the user interface screen 100, User 1 has entered two back-to-back communications with multiple queries. In User 2's response, each reply particularly references each corresponding query by repeating some of the query in order to establish a one-to-one correspondence between the reply and the query. This repetition can result in a slow down in the flow of the conversation and adds unnecessary dialog to a communication.

What is needed, therefore, is a way to associate responsive communications with corresponding communications to which the responses are directed without requiring re-entry of any of the preceding communication.

BRIEF SUMMARY OF THE INVENTION

Embodiments of the invention include a method, system, and computer program product for implementing message mapping of communications is provided. The method includes receiving a communication and a time-stamp of the communication from a messaging system of an originating terminal device and receiving a request to respond to the communication from a messaging system at a recipient terminal device. The request includes a first response and a first selected portion of the communication to which the first response is directed. The method also includes generating an index that defines parameters of the first selected portion in context with the communication and generating a responsive communication that includes the first response and the index. The index is operable for communicating the parameters of the first selected portion to the originating terminal device. The method further includes mapping the responsive communication to the communication via the time-stamp.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a user interface screen depicting a sample two-way communication using current messaging techniques;

The detailed description explains the preferred embodiments of the invention, together with advantages and features, by way of example with reference to the drawings.

DETAILED DESCRIPTION OF THE INVENTION

Message mapping of communications is provided in accordance with exemplary embodiments. The message mapping services enable users of a messaging tool to associate responsive communications with corresponding communications to which the responses are directed without requiring re-entry of any of the preceding communication.

Figure 2:
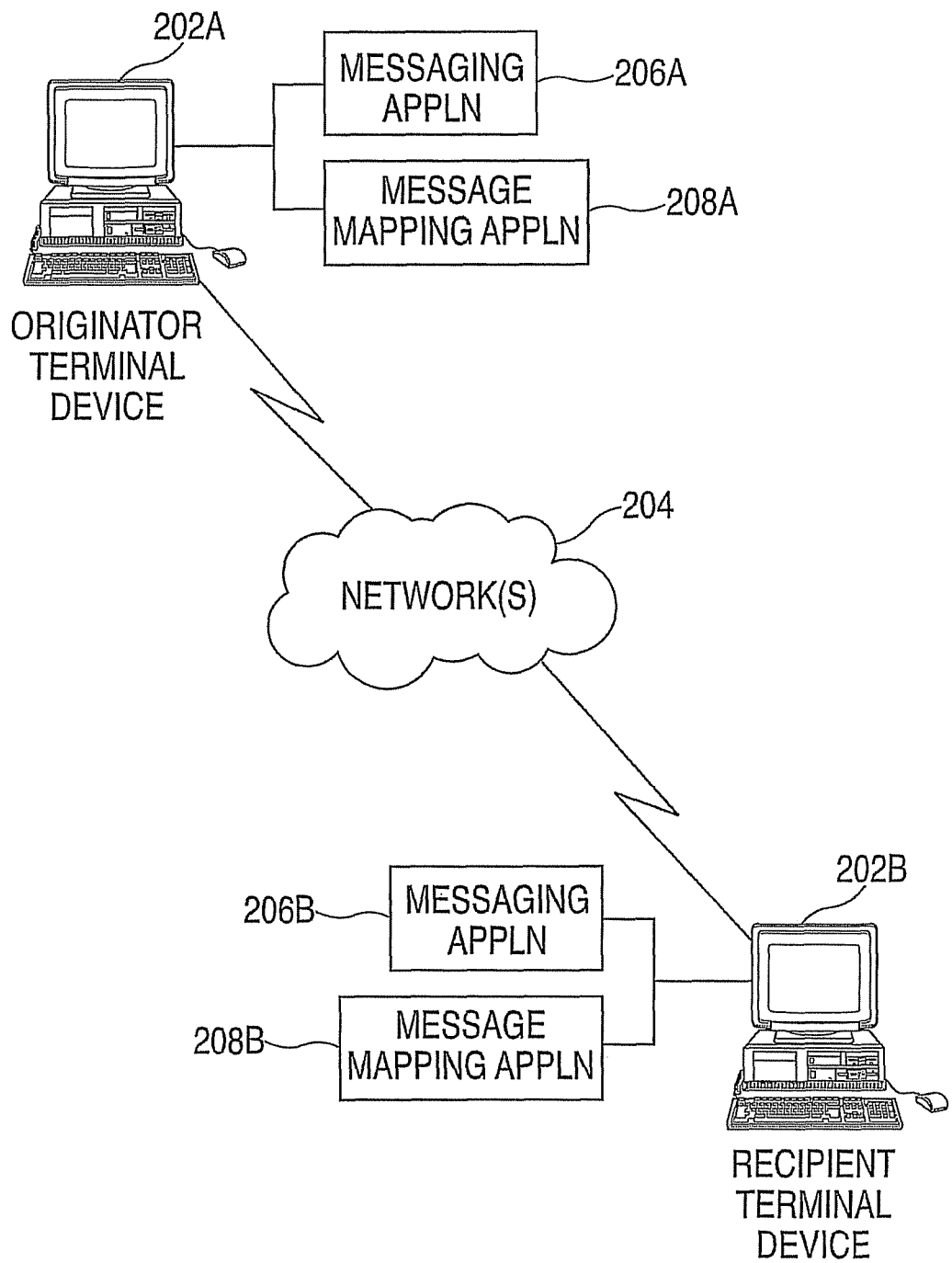
FIG. 2 is a block diagram depicting a system upon which message mapping of communications may be implemented in exemplary embodiments.

Turning now to FIG. 2, a system upon which the message mapping services may be implemented in accordance with exemplary embodiments will now be described. The system of FIG. 2 includes terminal devices 202A and 202B in communication with one another over one or more network(s) 204. Terminal devices 202A-202B may be implemented via computer processing devices (e.g., network workstations, personal desktop computers, laptops, etc.). For purposes of illustration, terminal device 202A refers to an originator terminal device (e.g., initiator of a communication) and terminal device 202B refers to a recipient terminal device. Terminal devices 202A-202B each implement a messaging application 206A-206B, respectively. In exemplary embodiments, messaging applications 206A-206B are instant messaging applications. In addition, each of terminal devices 202A-202B executes a message mapping application 208A-208B, respectively, for implementing the messaging mapping services described herein. Message mapping applications 208 may be integrated into the messaging applications 206 or may be stand-alone software that communicates with an off-the-shelf messaging application via, e.g., an application programming interface (API) or similar means.

Network(s) 206 may be implemented, e.g., as one or more of a local area network (LAN), wide area network (WAN), virtual private network (VPN) and global network (e.g., Internet).

As indicated above, the message mapping services enable users of a messaging tool (e.g., messaging applications 206A-206B) to associate responsive communications with corresponding communications to which the responses are directed without requiring re-entry of any of the preceding communication.

Figure 3:
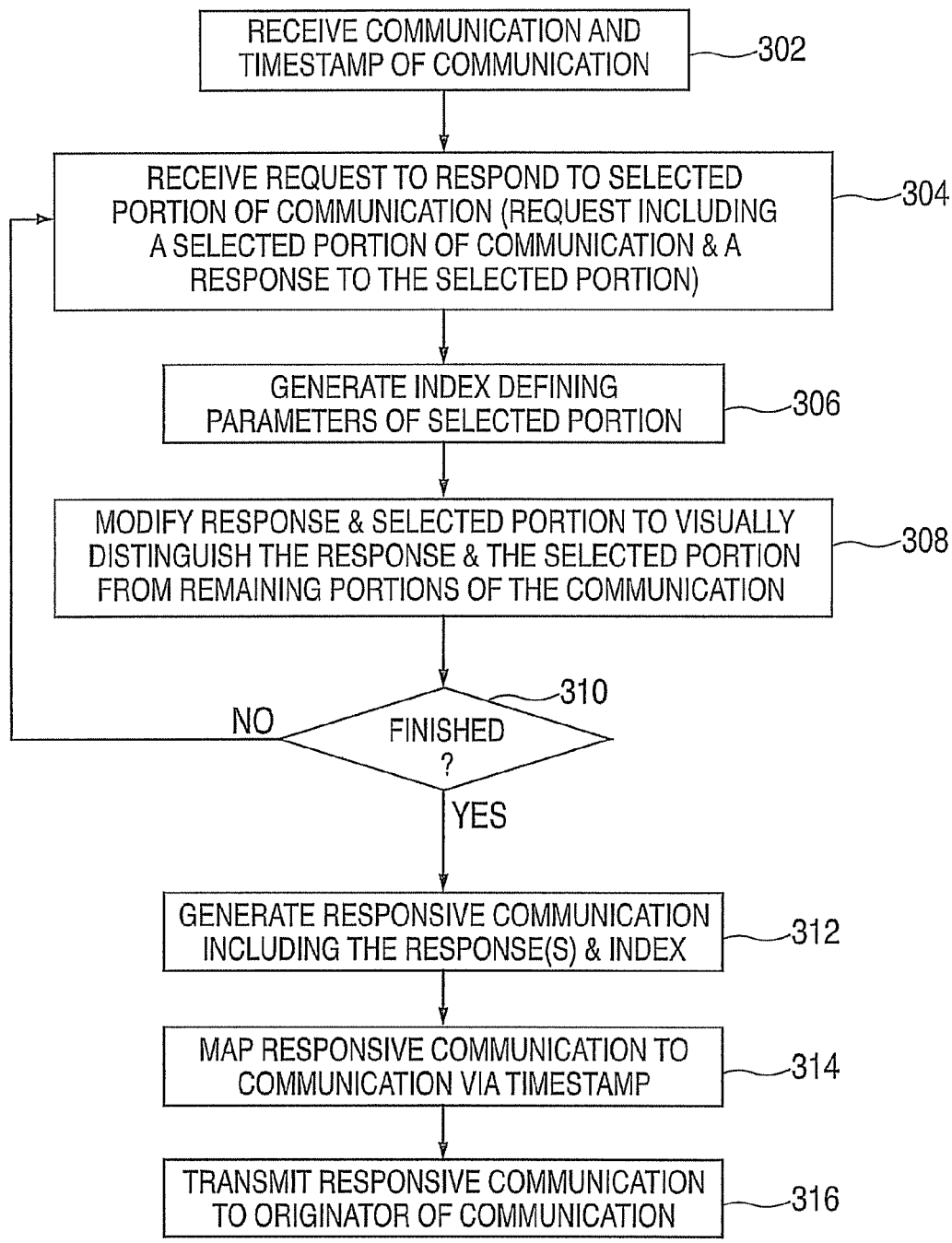
FIG. 3 is a flow diagram describing a process for implementing the message mapping activities in exemplary embodiments.

Turning now to FIG. 3, a process for implementing the message mapping services will now be described in exemplary embodiments. At step 302, a communication and a time-stamp of the communication is received at recipient terminal device 202B from originating terminal device 202A. The communication may be an email or instant message.

At step 304, the recipient terminal device 202B receives a request (from a user of recipient terminal device 202B) to respond to the communication. This may be implemented by selecting (e.g., highlighting) a desired portion of the communication to which the response is directed. Alternatively, if the user's response is directed generally to the entire communication, the user may select or highlight the entire communication if desired. The request is then implemented by selecting all or a portion of the communication to which a response is directed and entering the response at the recipient terminal device 202B.

At step 306, the message mapping application 208B generates an index that defines the parameters of the selected portion within the context of the communication. For example, the index may specify the beginning and end location of the selected portion. The index is used to instruct the originator terminal device 202A to modify the appearance of portions of the communication(s)/response(s) at the originator terminal device 202A as described further herein.

At step 308, the message mapping application 208B modifies the presentation of the selected portion and the response at the recipient terminal device 202B in order to visually distinguish the selected portion and response from non-selected portions of the communication. The selected portion and the response are modified in a similar manner to reflect a relationship or correspondence between them; that is, the response is a reply, or is related, to the selected portion of the communication. The modifications may be implemented using, e.g., bold, italics, font size changes, font color changes, font style change, or color highlights.

At step 310, it is determined whether the user at recipient terminal device 202B is finished. If not, the process returns to step 304 whereby the user selects another portion of the communication (or a portion of a second communication) to which a response is targeted. The index is then edited to reflect the parameters of the second selected portion. It will be understood that any number of portions/communications may be selected by the recipient terminal device 202B as desired.

If, however, the user is finished with the response at step 310, a responsive communication is generated that includes the response(s) and index at step 312. At step 314, the responsive communication is mapped to the communication (from the originator terminal device 202A) via the time-stamp received at step 302.

At step 316, the responsive communication is transmitted to the originator terminal device 202A along with the time-stamp. The time-stamp informs the messaging application 206A at the originator terminal device 202A that the responsive communication (and the individual response(s)) is directed to the communication having the time-stamp. The message mapping application 208A utilizes the time-stamp and index to identify the portion of the communication to which the response is directed. The message mapping application 208A may then use this information to modify the appearance (presentation) of the communication and the response to visually distinguish the selected portion and the response from non-selected portions of the communication.

Figure 4:
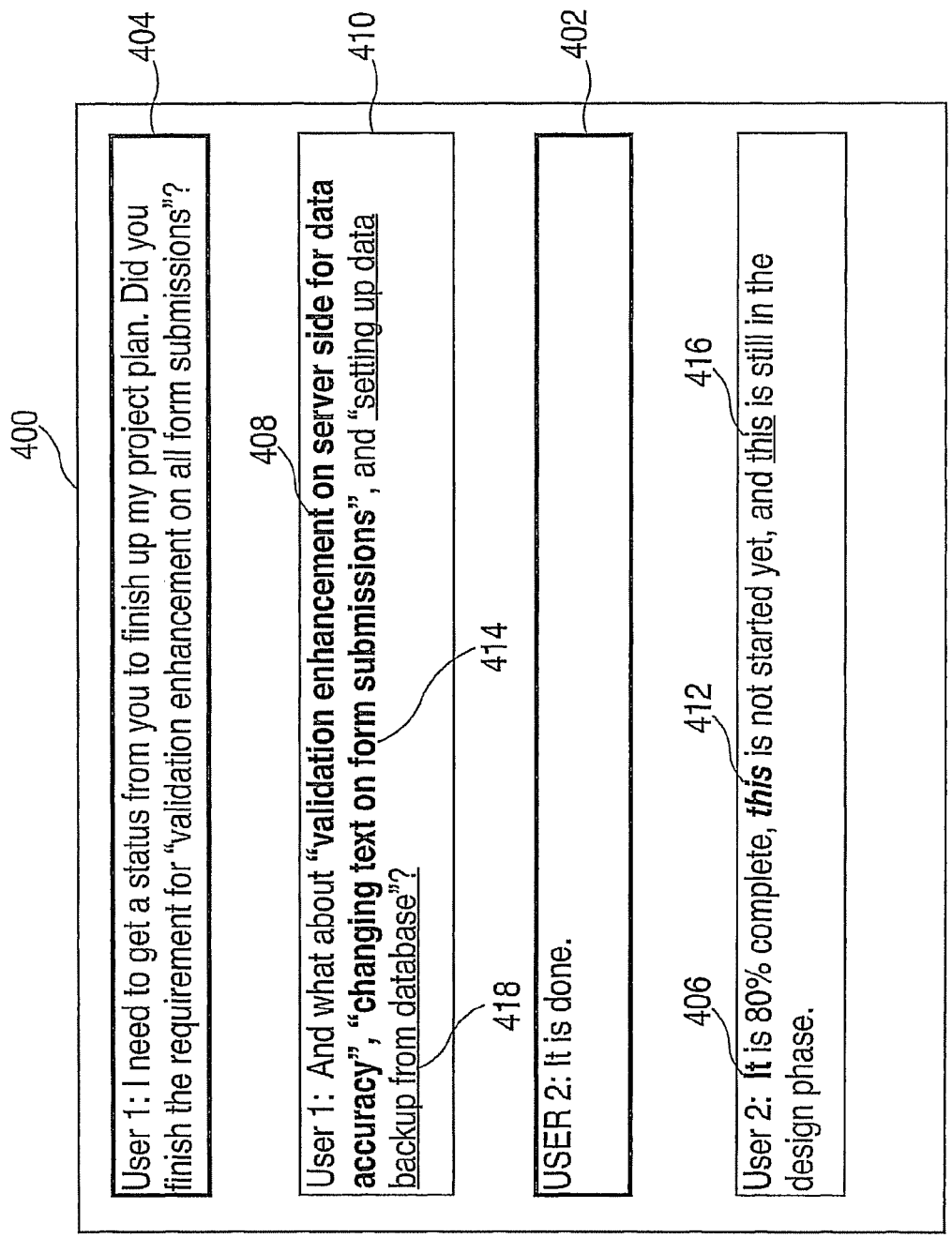
FIG. 4 is a user interface screen depicting a sample two-way communication implemented via the message mapping activities in exemplary embodiments.

If two or more responses have been generated by the recipient terminal device 202B, each of the responses and corresponding selected portions of the communications(s) may be respectively color coded or otherwise modified to visually distinguish them from non-selected portions of the communication. For example, FIG. 4 illustrates a user interface screen 400 including a message exchange between two users 1 and 2 as facilitated by the message mapping services. As shown in FIG. 4, a first response from User 2 402 and corresponding User 1's first communication 404 share a common formatting scheme (i.e., bold encapsulation). A second response from User 2 406 and corresponding portion 408 of User 1's second communication 410 share a common formatting scheme (i.e., bold text) that is different than the first scheme. Likewise, a third response of User 2 412 and corresponding portion 414 of User 1's second communication 410 share a common formatting scheme (i.e., bold italics) that is different than the first and second schemes. Finally, a fourth response of User 2 416 and corresponding portion 418 of User 1's second communication 410 share a common formatting scheme (i.e., underline text) that is different from the first, second, and third schemes. Note that each of the four formatting schemes is visually distinct from the non-selected portions of the communications.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of implementing message mapping of communications, comprising:

receiving a communication and a time-stamp of the communication from a messaging system of an originating terminal device;

receiving a request to respond to the communication from a messaging system at a recipient terminal device, the request including a first response and a first selected portion of the communication solely to which the first response is directed, wherein the first selected portion is a subset of content of the communication;

generating an index that defines parameters of the first selected portion in context with the communication;

generating a responsive communication that includes the first response and the index, the index operable for communicating the parameters of the first selected portion to the originating terminal device; and mapping the responsive communication to the communication via the time-stamp.

2. The method of claim 1, further comprising:
transmitting the responsive communication and the time-stamp of the communication to the originating terminal device.

3. The method of claim 1, further comprising:
modifying the first response and the first selected portion at the recipient terminal device to visually distinguish the first response and the first selected portion from non-selected portions of the communication; and
instructing the messaging system of the originating terminal device to modify presentation of the first response and the first selected portion at the originating terminal device via the index to visually distinguish the first response and the first selected portion from non-selected portions of the communication.

4. The method of claim 3, wherein the request further includes a second response and a second selected portion of the communication to which the second response is directed, the method further comprising:
editing the index to define parameters of the second selected portion in context with the communication; and
modifying the second response and the second selected portion at the recipient terminal device to visually distinguish the second response and the second selected portion from the first response, the first selected portion, and the non-selected portions of the communication; wherein the responsive communication includes the second response and the edited index.

5. The method of claim 3, wherein the first response and the first selected portion are visually distinguished from the non-selected portions of the communication using at least one of:
highlighting;
bold font;
italic font;
text color; and
font size.

6. The method of claim 1, wherein the messaging system includes at least one of an:
email application; and
instant messaging application.

7. A system for implementing message mapping of communications, comprising:
a computer processing device; and
a message mapping application executing on the computer processing device, the message mapping application performing a method, comprising:
receiving a communication and a time-stamp of the communication from a messaging system of an originating terminal device;
receiving a request to respond to the communication from a messaging system at the computer processing device, the request including a first response and a first selected portion of the communication solely to which the first response is directed, wherein the first selected portion is a subset of content of the communication;
generating an index that defines parameters of the first selected portion in context with the communication;
generating a responsive communication that includes the first response and the index, the index operable for communicating the parameters of the first selected portion to the originating terminal device; and
mapping the responsive communication to the communication via the time-stamp.

8. The system of claim 7, wherein the message mapping application further performs:
transmitting the responsive communication and the time-stamp of the communication to the originating terminal device.

9. The system of claim 7, wherein the message mapping application further performs:
modifying the first response and the first selected portion at the computer processing device to visually distinguish the first response and the first selected portion from non-selected portions of the communication; and
instructing the messaging system of the originating terminal device to modify presentation of the first response and the first selected portion at the originating terminal device via the index to visually distinguish the first response and the first selected portion from non-selected portions of the communication.

10. The system of claim 9, wherein the request further includes a second response and a second selected portion of the communication to which the second response is directed, the method further comprising:
editing the index to define parameters of the second selected portion in context with the communication; and
modifying the second response and the second selected portion at the computer processing device to visually distinguish the second response and the second selected portion from the first response, the first selected portion, and the non-selected portions of the communication; wherein the responsive communication includes the second response and the edited index.

11. The system of claim 9, wherein the first response and the first selected portion are visually distinguished from the non-selected portions of the communication using at least one of:
highlighting;
bold font;
italic font;
text color; and
font size.

12. The system of claim 7, wherein the messaging system includes at least one of an:
email application; and
instant messaging application.

13. A computer program product for implementing message mapping of communications, the computer program product comprising a non-transitory computer-readable medium having instructions embodied thereon, which when executed by a computer cause the computer to implement a method, the method comprising:
receiving a communication and a time-stamp of the communication from a messaging system of an originating terminal device;
receiving a request to respond to the communication from a messaging system at a recipient terminal device, the request including a first response and a first selected portion of the communication solely to which the first response is directed wherein the first selected portion is a subset of content of the communication;
generating an index that defines parameters of the first selected portion in context with the communication;
generating a responsive communication that includes the first response and the index, the index operable for communicating the parameters of the first selected portion to the originating terminal device; and
mapping the responsive communication to the communication via the time-stamp.

14. The computer program product of claim 13, further including instructions for performing:
transmitting the responsive communication and the time-stamp of the communication to the originating terminal device.

15. The computer program product of claim 13, further including instructions for performing:
modifying the first response and the first selected portion at the recipient terminal device to visually distinguish the first response and the first selected portion from non-selected portions of the communication; and
instructing the messaging system of the originating terminal device to modify presentation of the first response and the first selected portion at the originating terminal device via the index to visually distinguish the first response and the first selected portion from non-selected portions of the communication.

16. The computer program product of claim 15, wherein the request further includes a second response and a second selected portion of the communication to which the second response is directed, the method further comprising:
editing the index to define parameters of the second selected portion in context with the communication; and
modifying the second response and the second selected portion at the recipient terminal device to visually distinguish the second response and the second selected portion from the first response, the first selected portion, and the non-selected portions of the communication;
wherein the responsive communication includes the second response and the edited index.

17. The computer program product of claim 15, wherein the first response and the first selected portion are visually distinguished from the non-selected portions of the communication using at least one of:
highlighting;
bold font;
italic font;
text color; and
font size.

18. The computer program product of claim 15, wherein the messaging system includes at least one of an:
email application; and
instant messaging application.

* * * * *